United States Patent [19]

Yamano et al.

[11] Patent Number: 4,709,769

[45] Date of Patent: Dec. 1, 1987

[54] COMBINATION WEIGHING METHOD

[75] Inventors: Shoji Yamano, Akashi; Isao Miyamoto, Himeji, both of Japan

[73] Assignee: Yamato Scale Company, Limited, Akashi, Japan

[21] Appl. No.: 927,251

[22] Filed: Nov. 5, 1986

Related U.S. Application Data

[63] Continuation-in-part of Ser. No. 788,388, Oct. 17, 1985, Pat. No. 4,706,766.

[30] Foreign Application Priority Data

Oct. 26, 1984 [JP] Japan ................................ 59-226473

[51] Int. Cl.$^4$ ............................................. G01G 19/22
[52] U.S. Cl. ............................................. 177/1; 177/25
[58] Field of Search ................................. 177/1, 25.18

[56] References Cited

U.S. PATENT DOCUMENTS

| | | | |
|---|---|---|---|
| 4,399,880 | 8/1983 | Konishi | 177/1 |
| 4,538,692 | 9/1985 | Henry et al. | 177/25 |
| 4,605,082 | 8/1986 | Matsuura | 177/25 |

*Primary Examiner*—George H. Miller, Jr.
*Attorney, Agent, or Firm*—Senniger, Powers, Leavitt and Roedel

[57] ABSTRACT

A method of weighing out for packing quantities of product each having a weight satisfying a predetermined weight condition by a combination weighing machine including a plurality of weighing hoppers for weighing the product respectively and a plurality of auxiliary hoppers located under the weighing hoppers respectively for receiving the weighed product discharges therefrom. The weights of product are initially stored in weighing hopper memories corresponding to the respective weighing hoppers and then transferred to auxiliary hopper memories corresponding respectively to the auxiliary hoppers at the same time as the weighed product are discharged into the auxiliary hoppers and the emptied weighing hoppers are automatically re-loaded with fresh product to be weighed when a stable state is reached. While the fresh product is fed to the empty weighing hoppers and weighed therein, the weights stored in the auxiliary memories are combined in various fashion for selecting from the resultant combinations a combination whose sum weight satisfies the predetermined weight condition. The auxiliary hoppers corresponding to the selected combination are unloaded for packing and new weighed product are fed from the corresponding weighing hoppers and the next combination selection is effected in a similar manner with the weights currently stored in the auxiliary hopper memories. Such operation is repeated successively.

19 Claims, 12 Drawing Figures

Ci COMBINATION FOR INNER CHUTE
Co COMBINATION FOR OUTER CHUTE
Ui UNLOADING INTO INNER CHUTE
Uo UNLOADING INTO OUTER CHUTE

C COMBINATION
L LOADING
U UNLOADING
W WEIGHING
T TRANSFER
T/C COMBINATION DURING TRANSFER

C COMBINATION
L LOADING
U UNLOADING
W WEIGHING
T TRANSFER

- Co COMBINATION FOR OUTWARD UNLOAD
- Ci  ”          ”       INWARD    ”
- C COMBINATION
- L LOADING
- U UNLOADING
- W WEIGHING
- T TRANSFER
- T/C COMBINATION DURING TRANSFER

FIG. 11

COMBINATION WEIGHING METHOD

This is a continuation-in-part of application Ser. No. 788,388 now U.S. Pat. No. 4,706,766 filed Oct. 17, 1985.

BACKGROUND OF THE INVENTION

This invention relates to a combination weighing method for making various combinations of a plurality of weights of product and selecting therefrom a combination whose sum weight is equal or approximate to a predetermined weight.

Among the prior art combination weighing methods, one method involves utilizing a plurality of weighing units each adapted to weigh a fraction of the weight to be delivered and each adapted for unloading of product therefrom to contribute to a delivery. The method comprises for each delivery the steps of generating the values of combinations of weights on the weighing units which were unloaded in the preceding delivery and comparing the values with an acceptable weight standard to select a combination of weighing units to be unloaded to deliver a sum weight equal or approximate to the aforesaid predetermined weight, unloading the weighing units of the selected combination, loading the weighing units which were unloaded, and wherein, for each delivery, the step of generating and comparing the values of the combinations of weights on the weighing units excluding those units which were unloaded on the preceding delivery is initiated before completion of weighing out new loads in those weighing units. An example of this method is disclosed in coassigned U.S. Pat. Nos. 4,385,671 and 4,470,166.

In another prior art method, a plurality of weighing hoppers, each having a weight sensor, is provided. Each weighing hopper is associated with an auxiliary hopper, and an auxiliary hopper memory is provided corresponding to each auxiliary hopper. Product is weighed by each weighing unit and then transferred to the associated auxiliary hopper memory. The stored values are combined in various fashion to obtain a combination having a weight equal or approximate to a predetermined weight. An example of such method is disclosed in U.S. Pat. No. 4,437,527.

According to a further prior art method, as disclosed in U.S. Pat. No. 4,446,938, a plurality of weighing hoppers, each having an auxiliary hopper, is provided. Product weighed in each weighing hopper is transferred to the auxiliary hopper at the same time as its weight signal is stored in an auxiliary hopper memory. The emptied weighing hopper is reloaded with fresh product, and a combination computation is effected using its weight signal and the content of the auxiliary hopper memory.

According to the above method of '671 patent, it is possible to increase the number of discharges by the weighing units per unit time to obtain high speed operation. However, those weighing units which have been selected for any desired combination cannot participate in another combination computation until their loading, reloading and weighing operations are completed. During this time, therefore, the number of weighing units which can participate in the combination computation or search is reduced, which tends to reduce the accuracy of the selected combination weight. Although this problem can be reduced by increasing the number of weighing units per device, this will undesirably increase the size and cost of the device.

The problem of increase in size is solved by reducing the number of weighing units in accordance with the method of the abovementioned '527 or '938 patent. However, these methods are less effective to increase operational speed, since the unloading and reloading operations are rather time-consuming.

SUMMARY OF THE INVENTION

Therefore, an object of this invention is to provide an improved method for increasing the operational speed or working efficiency of the combination weighing machine without substantial increase in the size and cost thereof.

According to this invention, there is provided a method comprising a step of feeding product to each empty one of a plurality of auxiliary hoppers arranged so that they can be loaded with product from a plurality of weighing hoppers, respectively, from a corresponding one of these weighing hoppers. This feeding step is followed by loading and weighing steps for loading the emptied weighing hoppers with fresh product and weighing the same. In parallel with these feeding, loading and weighing steps, combination and unloading steps are effected for combining the weights of product of the loaded auxiliary hoppers in various fashion and selecting from the resultant combinations a specific combination whose sum weight is equal or approximate to a predetermined weight, and unloading the corresponding hoppers.

According to a feature of this invention, the product which can participate in each combination selecting operation is composed not only of the product which already has been fed into each auxiliary hopper, but also of the product which is on the way from each weighing hopper to the corresponding auxiliary hopper.

According to another feature of this invention, the product which has been weighed and is kept in each weighing hopper is also allowed to participate in the combination selecting operation together with the product in the corresponding auxiliary hopper.

These and other objects and features of this invention will be understood more clearly by reading the following description with reference to the accompanying drawings.

DESCRIPTION OF PREFERRED EMBODIMENTS

Figure 1:
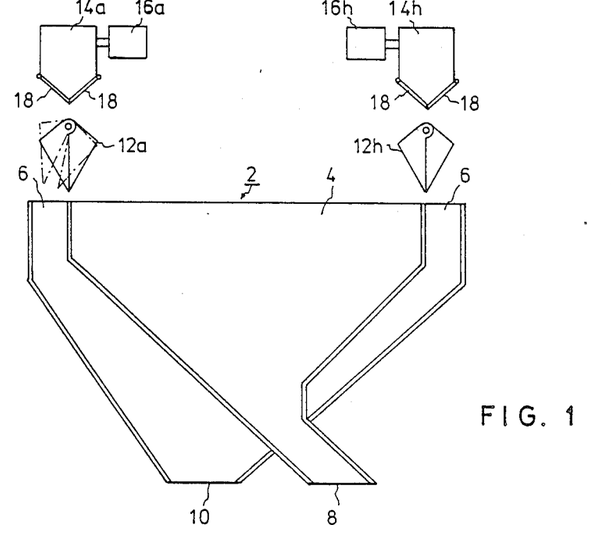
FIG. 1 is a schematic partially sectional side view representing a mechanical arrangement used in an embodiment of the combination weighing method according to this invention.
Figure 2:
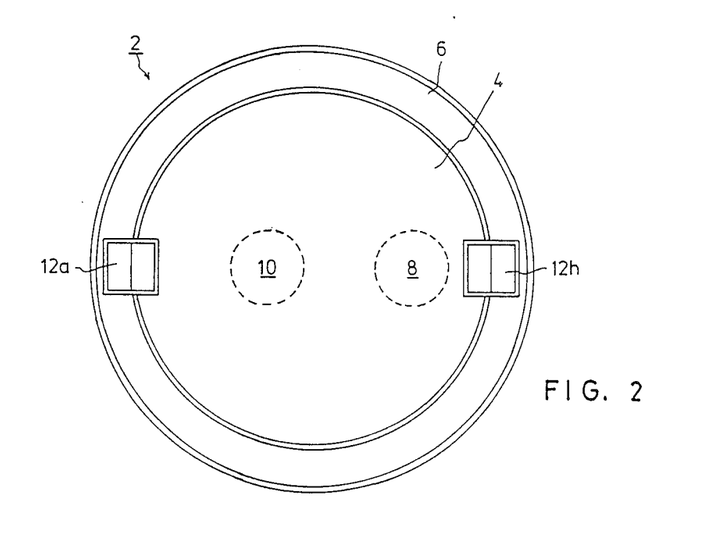
FIG. 2 is a schematic plan view representing the mechanical arrangement of FIG. 1.

Referring to FIGS. 1 and 2, a combination weighing machine used for realizing the method of this invention includes a double collecting chute 2 composed of two funnel-like inner and outer chutes 4 and 6 which are arranged substantially coaxially but have separate outlet ports 8 and 10 at their bottoms, respectively. A receiving device such as packing machine (not shown) is disposed under the outlet ports.

A plurality of, fourteen in this case, auxiliary hoppers 12a, 12b, ... 12n are arranged circularly above the peripheral edge of the inner chute 4. Each auxiliary hopper has a single double-jaw discharge gate at its bottom, the arrangement being such that the jaws of the gate pivot open toward the outer chute 6 as shown in phantom when the content is to be discharged into the outer chute, and pivot open toward the inner chute 4 in similar fashion when the content is to be discharged into the inner chute 4.

Fourteen weighing hoppers 14a, 14b, ... 14n are arranged respectively above the auxiliary hoppers 12a, 12b, 12n, and provided respectively with weight sensors 16a, 16b, ... 16n, such as load cells. The weighing hoppers 14a, 14b, ... 14n can weigh product fed by associated loading devices (not shown) and discharge the weighed contents into the underlying auxiliary hoppers through their double-door type gates 18, repectively.

As an aid to the following description, it is now assumed that it takes about 0.2 second to transfer or unload the content of each weighing hopper to the corresponding auxiliary hopper (hereinafter referred to as the transfer step), and about 0.2 second to load each weighing hopper by the as sociated loading device with about a predetermined weight of product and about 0.8 second after completion of loading of each weighing hopper until stabilization of the weight signal from the corresponding weight sensor (hereinafter referred to as the loading/weighing step). The time interval consisting of the transfer step and the loading/weighing step for each weighing hopper will be hereinunder referred to as "one weighing cycle". The length of time of this weighing cycle is therefore about 1.2 seconds. As explained below, a combination/unloading step is effected during each weighing cycle in parallel with the transfer step and the loading/weighing step for repeatedly combining the weights of product having been transferred to the auxiliary hoppers 12, selecting from the resultant combinations a combination whose sum weight is equal or approximate to a predetermined weight, and unloading the hoppers of the selected combination for delivery to the collecting chute 2.

Figure 3:
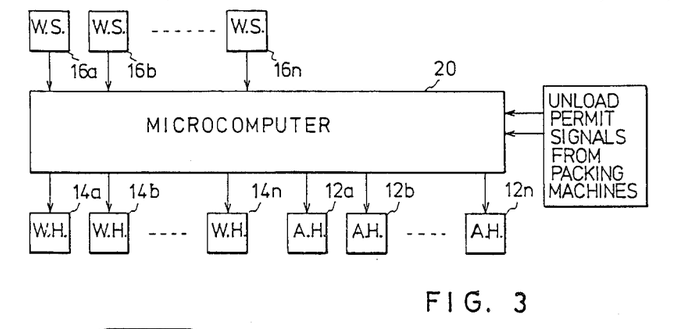
FIG. 3 is a block diagram representing an electric arrangement used in the embodiment of FIGS. 1 and 2.

As shown in FIG. 3, the weighing hoppers 14a 14b, . . 14n and the auxiliary hoppers 12a, 12b, ... 12n are coupled to a microcomputer 20 and controlled thereby. The microcomputer 20 receives the weight signals from the weight sensors 16a, 16b, ... 16n and, also, delivery permission signals produced alternately from two packing machines at fixed intervals. That is, the packing machine for the inner chute 4 produces delivery permission signals at intervals of 0.8 second, while the packing machine for the outer chute 6 produces delivery permission signals at intervals of 0.8 second with a delay of 0.4 second from the former signals. Each packing machine is ready for reception of product for packing when it produces a delivery permission signal.

Figure 4:
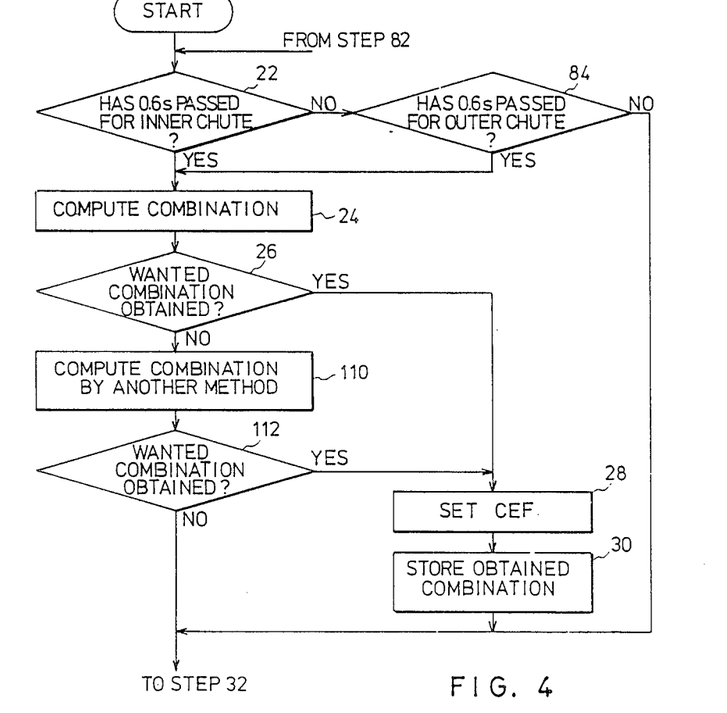
FIG. 4 is a flow chart representing an arithmetic operation sequence of the illustrative embodiment.

Assume now that all the weighing hoppers 14a, 14b, ... 14b and auxiliary hoppers 12a, 12b, ... 12n have been loaded and that the weights of product in weighing hoppers 14a 14b, ... 14n and the weights of product in auxiliary hoppers 12a, 12b, ... 12n are stored, respectively, in weighing and auxiliary hopper memories built in the microcomputer 20. While, in the execution of program, such flags as weighing end flags (WEF), unloading participation flags (UPF) and unloading flags (ULF) for respective weighing hoppers, empty flags (EMF) and inner and outer unloading flags (IUF and OUF) for respective auxiliary hoppers, computation end flags (CEF) and loading device flags (LDF) are used, it is also assumed that all the weighing end flags (WEF) have been set and all other flags have been reset. Under this condition, the arithmetic or computation sequence of FIG. 4 is initiated.

Figure 7:
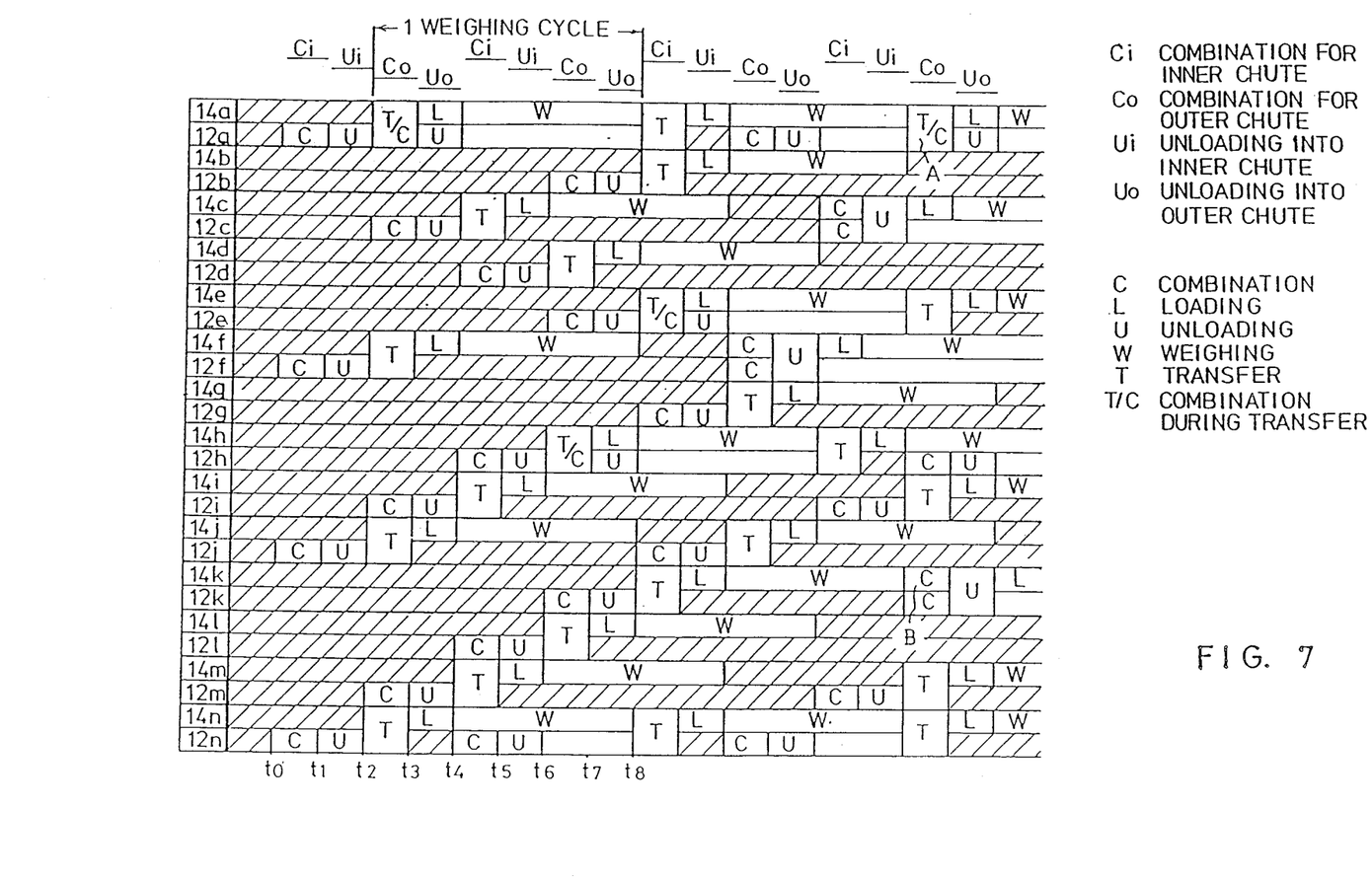
FIG. 7 is a timing chart of the same embodiment.

First, it is inquired, in step 22, whether a predetermined time has lapsed after initiation of unloading into the inner chute 4 of the collection chute assembly 2. For the first cycle of operation of the machine, the answer is assumed to be "YES". The stated predetermined time is 0.6 second, which is obtained by substracting the time required for the combination computation, which is 0.2 second as described later, from two thirds ($\frac{2}{3}$) of one weighing cycle time, which is 0.8 second as described above. Thus, the first combination computation is effected in step 24. In the first combination computation, the weight values stored in the auxiliary hopper memories corresponding to those auxiliary hoppers whose empty flags (EMF) have been reset are combined sequentially in accordance with the change of respective bits of a binary counter the number of bits of which is equal to the number of the auxiliary hoppers, and a combination whose sum is equal or nearest to a predetermined weight is selected from the resultant combinations. Now, it is assumed, for example, that the auxiliary hoppers 12a, 12f, 12j and 12n have been selected, as shown in FIG. 7.

Next, in step 26, it is inquired whether any desired combination as mentioned has been obtained or not. In this case, the answer is "YES". Therefore, the computation end flag (CEF) is set in step 28 and the obtained combination participating in the unloading operation is stored in step 30. Then, the program is progressed to the auxiliary hopper sequence shown in FIG. 5. This sequence is executed from time t0 to t1 in the time chart of FIG. 7. The time between t0 and t1 is about 0.2 second.

Figure 5:
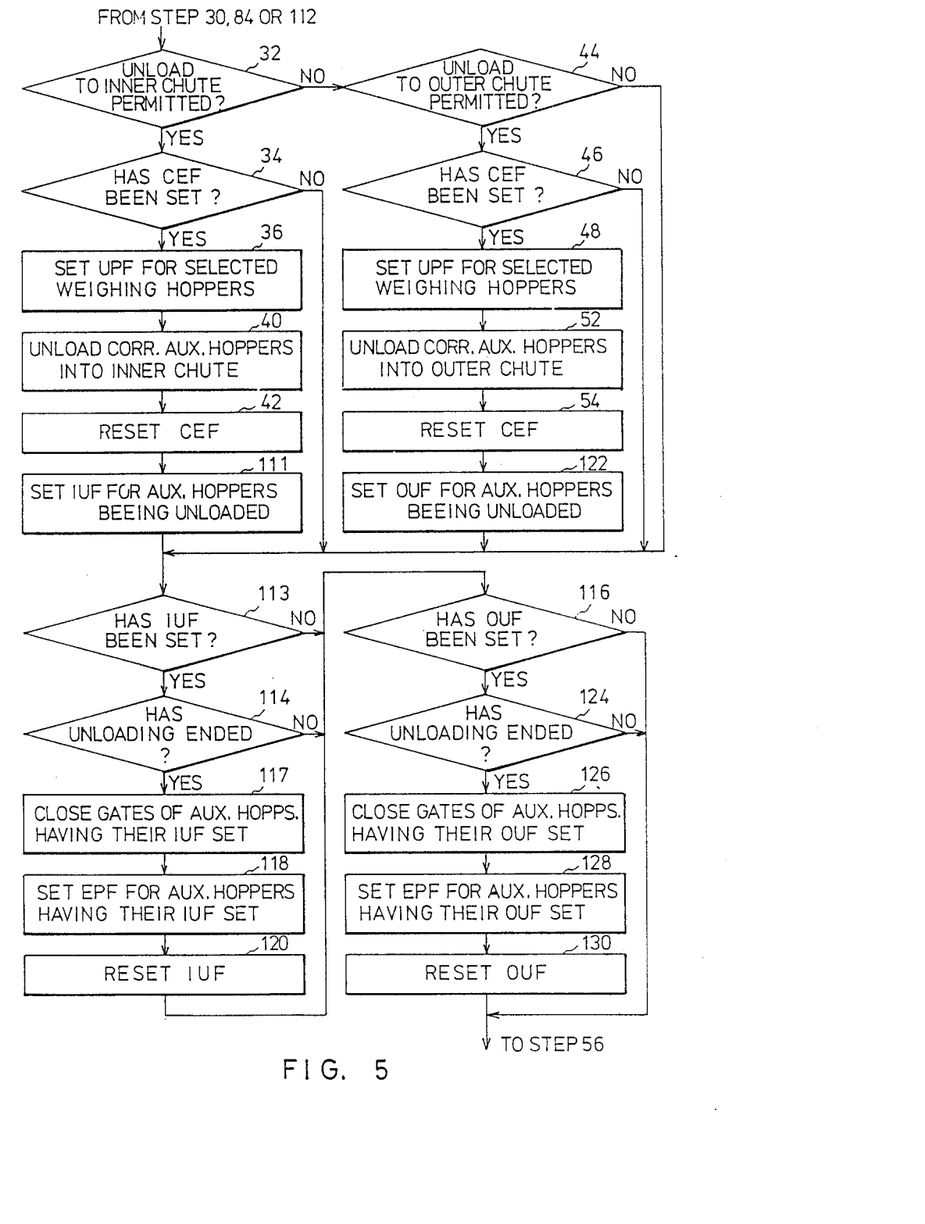
FIG. 5 is a flow chart representing an auxiliary hopper sequence of this embodiment.
Figure 6A:
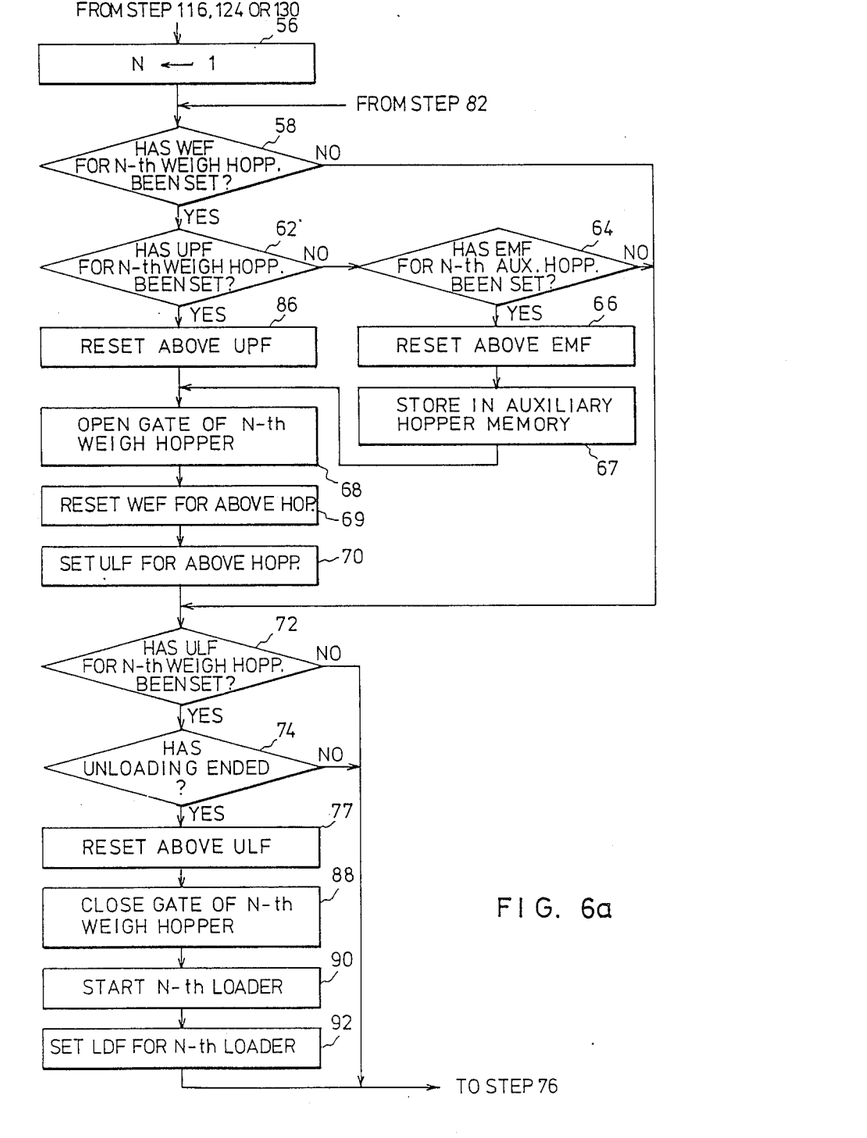
FIGS. 6a and 6b are flow charts representing a weighing hopper sequence of the same embodiment.
Figure 6B:
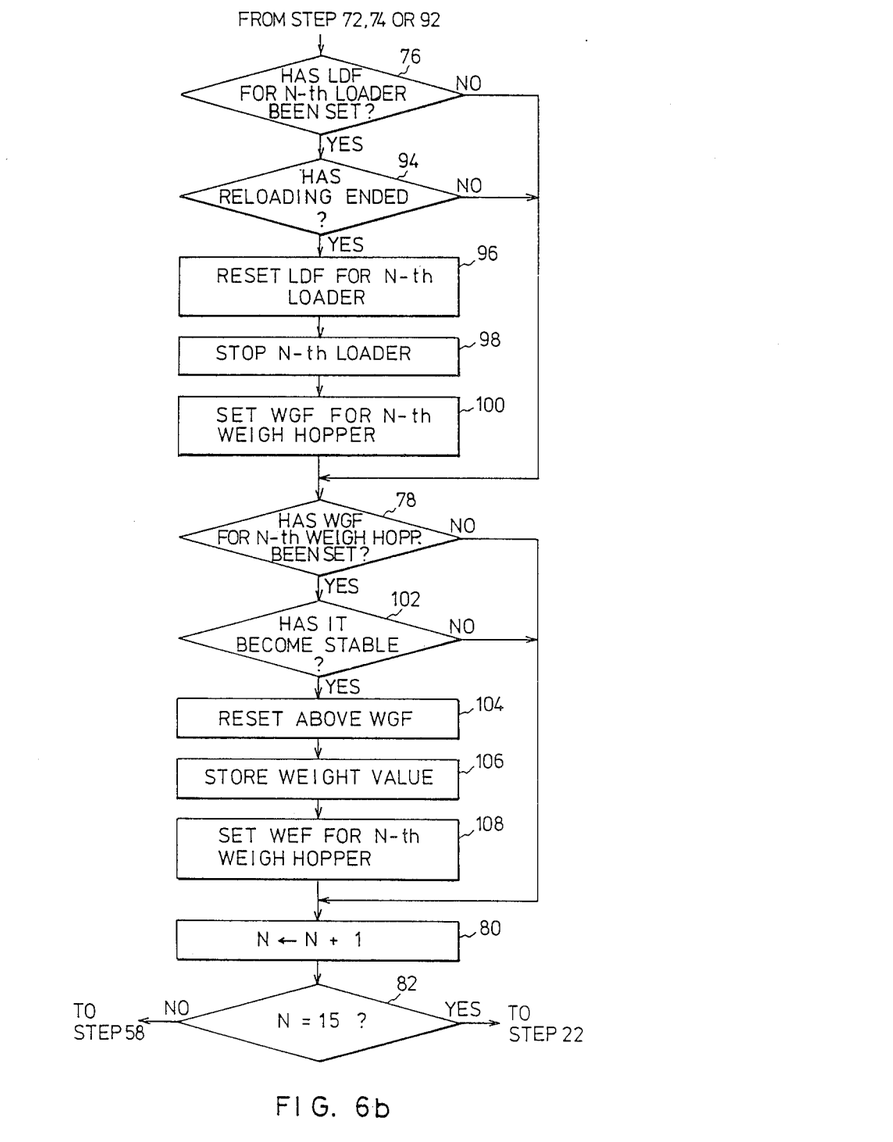

In this sequence, it is first inquired in step 32 whether the packing machine has delivered a delivery permission signal for the inner chute 4 of the collection chute assembly 2. If the answer is "YES", it is further inquired, in step 34, whether the computation end flag (CEF) has been set or not. If the answer is "YES", unloading participation flags (UPF) for the weighing hoppers corresponding to the unloading participating combination are set in step 36. In the first cycle, however, these flags are not set, since the combination is composed of auxiliary hoppers only. In step 40, the auxiliary hoppers 12a, 12f, 12j and 12n corresponding to the unloading participating combination are caused to initiate discharge of their product into the inner chute 4 of the collection chute assembly 2. Then, the computation end flag (CEF) is reset in step 42 and the inner unloading flags (IUF) for these auxiliary hoppers which have initiated discharge are set in step 111. Next, it is inquired, in step 113, whether the inner unloading flag (IUF) has been set or not. The answer is of course "YES". Accordingly, it is inquired, in step 114, whether the unloading operation has ended or not. The answer is "NO" in this case and, therefore, it is further inquired, in step 116, whether the outer unloading flag (OUF) has been set or not. The answer is "NO" in this case. Accordingly, the program is progressed to the weighing hopper sequence of FIG. 6. This is done at time t1.

In this sequence, the content N of an N-register is made one (1) in step 56. The numeral N represents one of decimal code numbers 1, 2, . . . 14 corresponding respectively to the weighing hoppers 14a, 14b, . . . 14n. Then, it is inquired, in step 58, whether the weighing end flag (WEF) for N-coded weighing hopper, which now corresponds to weighing hopper 14a, has been set or not. The answer is "YES" at this time. Therefore, it is further inquired, in step 62, whether the unloading participation flag (UPF) for N-coded weighing hopper has been set or not. The answer is "NO" at this time. Therefore, it is inquired, in step 64, whether the empty flag (EMF) of N-coded auxiliary hopper, which now corresponds to auxiliary hopper 12a, has been set or not. The answer is "NO" at this time. Therefore, it is further inquired, in step 72, whether the unloading flag (ULF) for the N-coded weighing hopper has been set or not. The answer is "NO" at this time. Therefore, it is inquired, in step 76, whether the N-coded loading device flag (LDF), corresponding to weighing hopper 14a, has been set or not. The answer is "NO" at this time. Therefore, it is further inquired, in step 78, whether the weighing flag (WGF) for N-coded weighing hopper has been set or not. The answer is "NO" at this time. In the next step 80, therefore, the content of N-register is increased by one, that is, to two (2) and it is inquired, in step 82, whether N is equal to fifteen (15) or not. The number "15" is selected as a number which is greater by one than the maximum N, that is, fourteen which is the number of weighing hoppers. The answer is "NO" at this time and the program returns to step 58. Thereafter, steps 58, 62, 64, 72, 76, 78, 80 and 82 are repeated sequentially in similar fashion, the N-register being incremented by one every pass through step 80, for the remaining weighing hoppers 14b to 14n and corresponding auxiliary hoppers 12b to 12n. In the last such repetition, the content of the N-register is incremented up to fifteen (15) in step 80 and, therefore, the answer in step 82 becomes "YES". Thus, the program returns to the computation sequence of FIG. 4.

In this computation sequence, the answer in step 22 is "NO", since the predetermined time, that is, 0.6 second has not yet passed for discharge into the inner chute. Therefore, it is further inquired, in step 84, whether the predetermined time has lapsed or not, for discharge into the outer chute. The answer is also "NO" for the same reason. Consequently, the program is progressed to the auxiliary hopper sequence of FIG. 5.

At this time, no delivery permission signal has been provided from the packing machine for both inner and outer chutes. Therefore, the answers in the successive steps 32 and 44 are "NO". Accordingly, the program is progressed through steps 113, 114 and 116 and the weighing hopper sequence of FIG. 6 and the computation sequence of FIG. 4 are repeated, as described above.

After suitable repetition of these sequences, 0.2 second passes after initiation of unloading of the auxiliary hoppers 12a, 12f, 12j and 12n and the answer in step 114 becomes "YES". Thus, the discharge gates of these auxiliary hoppers, for which the inner unloading flags (IUF) have been set, are closed in step 117 and the empty flags (EMF) are set for these hoppers in step 118. Thereafter, the inner unloading flags (IUF) are reset in step 120 and the program is progressed through step 116 to the weighing hopper sequence of FIG. 6, as described above. Thus, the unloading operation for the selected auxiliary hoppers 12a, 12f, 12j and 12n is completed. This time point is t2 as shown in FIG. 7, which is about 0.2 second after the initiation of unloading of the selected auxiliary hoppers.

In the weighing hopper sequence of FIG. 6, the content of N-register is initialized to one (1) in step 56, and steps 58, 62 and 64 are executed sequentially as described above. In this case, however, the answer in step 64 is "YES" since the empty flag (EMF) for N-coded auxiliary hopper, which is now auxiliary hopper 12a since N=1, has been set. Therefore, this flag is reset in step 66 and the content of the weighing hopper memory for weighing hopper 14a is tranferred to the auxiliary hopper memory for auxiliary hopper 12a in step 67. Thereafter, the discharge gate of N-coded weighing hopper, which is weighing hopper 14a in this case, is opened in step 68. Then, the unloading end flag (UEF) for this weighing hopper 14a is reset in step 69 and the unloading flag (ULF) therefor is set in step 70. In the next step 72, therefore, the answer is "YES" at this time. Therefore, it is further inquired, in step 74, whether the unloading operation has been completed or not. The answer is "NO" at this time. Accordingly, the program is progressed through steps 76, 78, 80 and 82 back to step 58, as described afore. In step 80, the code number N is increased to two (2), during this excursion.

As the weighing end flag (WEF) for N-coded weighing hopper, which is now weighing hopper 14b, is set initially, the answer in step 58 is "YES". As the unloading participation flag (UPF) for weighing hopper 14b has been reset, the answer in step 62 is "NO". As the empty flag (EMF) for auxiliary hopper 12b has been reset, the answer in step 64 is also "NO". Accordigly, the program is progressed thereafter through steps 72, 76, 78, 80 and 82 back to step 58, increasing N by one every time step 80 is executed until N is fifteen, as judged in step 82. In accordance with such execution of the weighing hopper sequence, transfer of product from weighing hoppers 14a, 14f, 14j and 14n to auxiliary hoppers 12a, 12f, 12j and 12n, respectively, is initiated. This time point is also t2.

Following this weighing hopper sequence, the computation sequence of FIG. 4 is executed again. Since 0.6 second, the predetermined time, has not yet passed after initiation of discharge into the inner chute 4, the answer in step 22 is "NO" and the program is progressed to step 84. It has been stated previously that the answer in step 84 is assumed to be "YES" in the first cycle only. Thus, steps 24, 26, 28 and 30 are executed as described above. After time t2, the product weighed in weighing hoppers 14a, 14f, 14j and 14n is on the way (being transferred) to underlying auxiliary hoppers 12a, 12f, 12j and 12n, respectively. However, the corresponding weight values have been transferred to the corresponding auxiliary hopper memories and can participate in the combination computation in step 24. Therefore, for the purpose of illustration, the product which is on the way from weighing hopper 14a to auxiliary hopper 12a is assumed to have been selected as desirable, together with the product in auxiliary hoppers 12c, 12i and 12m, in step 24, as shown in FIG. 7. This sequence is ended at time t3 and the program is progressed again to the auxiliary hopper sequence of FIG. 5.

At this time, the delivery permission signal for the outer chute 6 has been provided from the packing machine, instead of that for the inner chute 4. Therefore, the answer in step 32 is "NO", while that in step 44 is "YES". Thus, steps 46, 48, 52, 54 and 122 are executed in the same fashion as aforementioned steps 34, 36, 40, 42 and 111, except that the outer chute 6 is involved in steps 52 and 122. While the selected auxiliary hoppers 12c, 12i and 12m initiate discharge of their product into the outer chute 6 in accordance with the instruction in step 52, the product which was on the way from weighing hopper 14a to auxiliary hopper 12a is also discharged through the opened gate of auxiliary hopper 12a. In the next step 113, the answer is "NO" at this time since the inner unloading flag (IUF) has been reset in the preceding step 111, while the answer in the following step 116 is "YES" since the outer unloading flag (OUF) has been set in step 122. Therefore, it is inquired, in step 124, whether the unloading operation has ended or not. The answer is "NO" since it is now progressing. Therefore, the program is progressed to the weighing hopper sequence of FIG. 6. This time point is t3+t and t is generally a very short time such as in the order of one micro-second. The product transferred from weighing hoppers 14f, 14j and 14n to auxiliary hoppers 12f, 12j and 12n are held therein as they are.

In the weighing hopper sequence, the content of N-register is reset to one (1) and it is inquired, in the next step 58, whether the weighing end flag (WEF) for N-coded weighing hopper, that is, weighing hopper 14a, has been set or not. The answer is "NO" since this flag was reset in step 69 during the preceding execution of this sequence. Therefore, it is inquired, in step 72, whether the unloading flag (ULF) for weighing hopper 14a has been set or not. The answer is "YES" since it was set in step 70 during the preceding execution of this sequence. Therefore, it is further inquired, in step 74, whether the unloading operation of this weighing hopper has been completed or not. The answer is "YES" since it has been completed already. Accordingly, the unloading flag (ULF) for this weighing hopper is reset in step 77, the discharge gate of this weighing hopper is closed in step 88, the loading device for this weighing hopper is operated to start reloading it in step 90 and the loading device flag (LDF) for this loading device is set in step 92. Accordingly, the answer in the next step 76 is "YES" and it is further inquired, in step 94, whether the reloading operation has been completed or not. The answer is initially "NO". Therefore, steps 78, 80 and 82 are executed and the program returns to step 58, as described afore. Thereafter, similar operations are repeated to start reloading of the emptied weighing hoppers 14f, 14j and 14n.

When the content of N-register has incremented to fifteen, the program returns from step 82 to the computation sequence of FIG. 4. However, since the answers in steps 22 and 84 are both "NO", the program progresses immediately to the auxiliary hopper sequence of FIG. 5. In this sequence, steps 32, 44, 113 and 116 are executed sequentially since the answers in steps 32, 44 and 113 are all "NO". However, the answer in step 116 is "YES" since the outer unloading flag (OUF) was set in step 122 during the preceding execution of this sequence. Therefore, it is inquired, in step 124, whether the unloading operaton has been completed or not. The answer is "NO" since it is now progressing. Thus, the program is progressed to the weighing hopper sequence of FIG. 6, as auxiliary hoppers 12a, 12c, 12i and 12m are discharging their product.

In this weighing hopper sequence, steps 56, 58, 72, 76 and 94 are executed for weighing hoppers 14a, 14f, 14j and 14n which are now being reloaded. Accordingly, the answer in step 94 is "NO" and steps 78, 80 and 82 are executed as keeping these weighing hoppers in the way of reloading. On the other hand, for the other weighing hoppers which have their weighing operations completed already, the answer in step 58 is "YES" and, therefore, steps 62, 64, 72, 76, 78, 80 and 82 are executed. Accordingly, these weighing hoppers maintain the state of completion of weighing operation and the program returns to the computation sequence. Then, the computation, auxiliary hopper and weighing hopper sequences are repeated similarly until auxiliary hoppers 12a, 12c, 12i and 12m are completely unloaded.

When auxiliary hoppers 12a, 12c, 12i and 12m have been unloaded, the answer in step 124 of the auxiliary hopper sequence of FIG. 5 becomes "YES". Therefore, the discharge gates of these auxiliary hoppers, for which the outer unloading flags (OUF) have been set, are closed in step 126, empty flags (EMF) are set for these auxiliary hoppers in step 128 and the outer unloading flag (OUF) is reset in step 130. Then, the program is progressed to the weighing hopper sequence of FIG. 6. This time point is t4 of FIG. 7.

In this weighing hopper squence, steps 56, 58, 72, 76 and 94 are executed as described above for weighing hoppers 14a, 14f, 14j and 14n. In step 94, however, the answer is "YES" since these hoppers have been unloaded completely. Therefore, the loading device flag (LDF) for N-coded loading device is reset in step 96, N-coded loading device is stopped in step 98, the weighing flag (WGF) for N-coded weighing hopper is set in step 100 and it is inquired, in step 78, whether the weighing flag (WGF) has been set or not. As the answer is "YES", it is further inquired, in step 102, whether the weight signal has become stable or not. The answer is initially "NO" and the operation returns through steps 80 and 82 to step 58. Thereafter, this sequence of operation is repeated and the code number N successively incremented in step 80 until N reaches fifteen (15). Thus, the weighing operations of weighing hoppers 14a, 14f, 14j and 14n are commenced.

For weighing hoppers 14c, 14i and 14m, however, the answer in step 58 is "YES" since the weighing end flags (WEF) for these hoppers have been set initially. Therefore, steps 62, 64, 66, 67, 68, 69, 70, 72, 74, 76, 78, 80 and 82 are executed as aforementioned in conjunction with weighing hopper 14a. Thus, these weighing hoppers 14c, 14i and 14m begin to discharge their product into underlying auxiliary hoppers 12c, 12i and 12m, respectively. Then the program is progressed to the computation sequence of FIG. 4.

Now, the predetermined time, 0.6 second, has passed after initiation of discharge from auxiliary hoppers 12a, 12f, 12j and 12n into inner chute 4 in step 40, so that the answer in step 22 is "YES". Therefore, the third combination computation is effected in step 24. Weighing hoppers 14a, 14f, 14j and 14n and auxiliary hopper 12a cannot participate in this computation. It is assumed for the purpose of illustration that the product in auxiliary hoppers 12d, 12h, 12l and 12n are selected as the best combination. Then, the answer in step 26 is "YES" and the program is progressed through steps 28 and 30 to the auxiliary hopper sequence of FIG. 5. This time point is t5 of FIG. 7.

The auxiliary hopper sequence is executed in the same fashion as described above in conjunction with auxiliary hoppers 12a, 12f, 12j and 12n, to commence discharge of the product in the selected auxiliary hoppers 12d, 12h, 12l and 12n into inner chute 4, and the program is progressed to the weighing hopper sequence of FIG. 6. This sequence is executed also in the same fashion as described already, to close the discharge gates of weighing hoppers 14c, 14i and 14m and to commence reloading thereof.

At time t6, the discharge gates of auxiliary hoppers 12d, 12h, 12l and 12n are closed and the reloading operation of weighing hoppers 14c, 14i and 14m is stopped for effecting weighing operation. At the same time, the fourth combination computation is effected with the product in auxiliary hoppers 12b, 12c, 12e, 12f, 12g, 12i, 12j, 12k and 12m and also the product on the way from weighing hoppers 14d, 14h and 14l to auxiliary hoppers 12d, 12h and 12l, respectively.

The computation ends at time t7 as shown in FIG. 7. Assuming that the product in auxiliary hoppers 12b, 12e and 12k and the product on the way from weighing hopper 14h to auxiliary hopper 12h have been selected as the best combination, then the discharge gates of auxiliary hoppers 12b, 12e, 12h and 12k are opened to deliver the selected product into outer chute 6 and the discharge gates of weighing hoppers 14d and 14l are closed to commence reloading of these emptied hoppers.

At time t8, the discharge gates of auxiliary hoppers 12b, 12e and 12k are closed and the reloading operation of weighing hoppers 14d, 14h and 14l is stopped for effecting weighing operation. By this tme, the weight signals from weighing hoppers 14a, 14f, 14j and 14n become stable and "YES" answer is obtained in step 102 of the weighing hopper sequence for these hoppers. Therefore, the weighing flags (WGF) for these weighing hoppers are reset in step 104, the weight signals from these hoppers are stored in the corresponding weighing hopper memories in step 106 and the weighing end flag (WEF) for these hoppers are set in step 108. Thus, the weighing operation of weighing hoppers 14a, 14f, 14j and 14n has been completed and the weighing period extends from time t4 to t8, which is about 0.8 second. Thereafter, the computation sequence is executed to effect the fifth combination computation. This computation is also participated in by weighing hoppers 14a and 14n since the underlying auxiliary hoppers 12a and 12n are empty, but not by weighing hoppers 14f and 14j since the underlying auxiliary hoppers 12f and 12j are filled. Thereafter, the operation is effected sequentially in similar fashion to deliver the desired amount of product alternately through the inner and outer chutes 4 and 6 of the collection chute assembly 2 to the packing machines.

When no combination satisfying the preset condition is obtained in step 26 of the computation sequence, another computation is effected in step 110 in accordance with a special combination pattern as shown in the following table.

TABLE

| Set No. | Weighing and auxiliary hoppers 14 and 12 | | | | | | | | |
|---|---|---|---|---|---|---|---|---|---|
| | a | b | c | d | e | f | ... | m | n |
| 1 | 1 | 0 | 0 | 0 | 0 | 0 | | 0 | 0 |
| 2 | 2 | 0 | 0 | 0 | 0 | 0 | | 0 | 0 |
| 3 | 0 | 1 | 0 | 0 | 0 | 0 | | 0 | 0 |
| 4 | 1 | 1 | 0 | 0 | 0 | 0 | | 0 | 0 |
| 5 | 2 | 1 | 0 | 0 | 0 | 0 | | 0 | 0 |
| 6 | 0 | 2 | 0 | 0 | 0 | 0 | | 0 | 0 |
| 7 | 1 | 2 | 0 | 0 | 0 | 0 | | 0 | 0 |
| 8 | 2 | 2 | 0 | 0 | 0 | 0 | | 0 | 0 |
| 9 | 0 | 0 | 1 | 0 | 0 | 0 | | 0 | 0 |

This combination pattern is composed of ternary codes, as will be readily understood, and it is initially prescribed that the ternary code "1" means only the auxiliary hopper being combined and the ternary code "2" means both the weighing and auxiliary hoppers being combined. For example, No. 4 combination consists of auxiliary hoppers 12a and 12b, while No. 7 combination consists of auxiliary hoppers 12a and 12b and weighing hopper 14b. According to this combination pattern, each weighing hopper can participate in the combination together with its underlying auxiliary hopper. While this combination pattern includes $2^{14}-1$ sets of combinations which consist of auxiliary hoppers only, which combinations were already generated in the computation in step 24, such combinations may be omitted from the table for saving time.

If a desired combination is obtained, the program is progressed through steps 112, 28 and 30 to the auxiliary hopper sequence as described formerly. If not, the program is progressed from step 112 directly to the auxiliary hopper sequence in order to wait for an increase in the number of hoppers which can participate in the computation due to the lapse of time.

When the answer in step 112 is "YES", the auxiliary hopper sequence is executed through steps 32, 34 and 36 or through steps 32, 44, 46 and 48. In step 36 or 48, the unloading participation flags (UPF) for the selected weighing hoppers are set, and the corresponding auxiliary hoppers begin to be unloaded. The steps as described previously follow and step 62 of the weighing hopper sequence (FIG. 6) is reached. As the unloading participation flags (UPF) for the selected weighing hoppers have been set as above, these flags are reset in step 86 and the selected weighing hoppers begin to be unloaded in step 68. At this time, however, the corresponding auxiliary hoppers are also discharging their product. Consequently, the product discharged from the selected weighing hoppers will pass through the underlying auxiliary hoppers to be delivered to the chute.

In this embodiment, the weighing cycle time is 1.2 seconds and two packing machines provide the delivery permission signals at 0.4 second intervals. Therefore, the packing machines can receive product from the combination weighing machine three times every weighing cycle. Thus, high speed operation of the weighing and packing system can be obtained by synchronizing the weighing cycle completely with the packing cycle as illustrated above.

Figure 8:
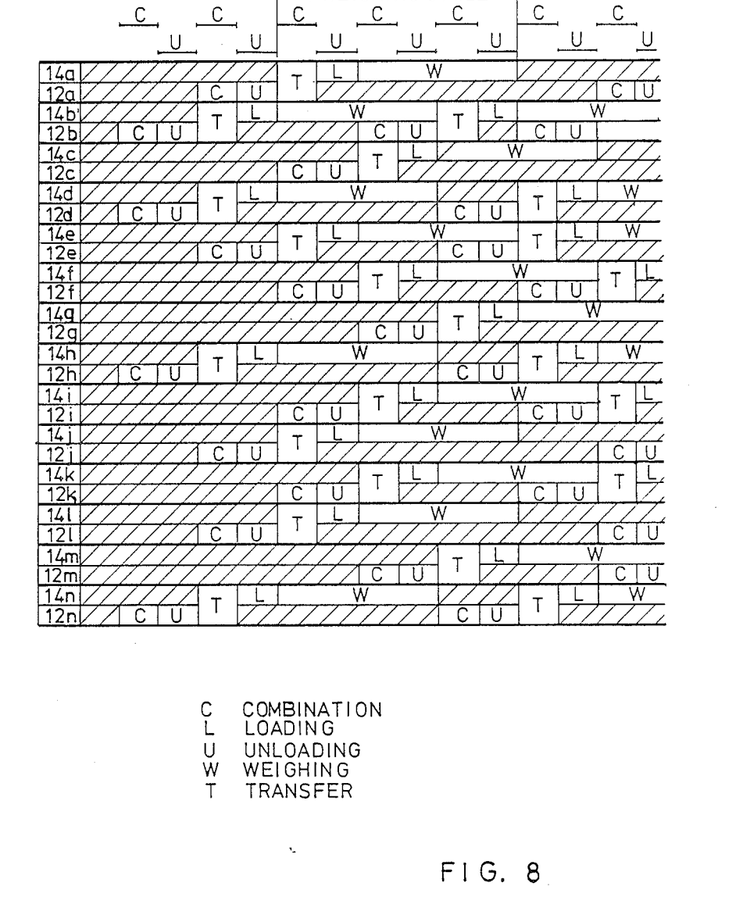
FIG. 8 is a timing chart of another embodiment of the method of this invention.

While, in the above embodiment, the combination computation is effected not only with product in the auxiliary hoppers but also with product falling from weighing hoppers down toward empty auxiliary hoppers, the computation can be effected with product in auxiliary hoppers only. To this end, however, the program must be modified to insert steps 66 and 67 between steps 74 and 77 instead of 64 and 68, and to delete steps 62, 86, 36, 48, 110 and 112. An exemplary time chart of this case is shown in FIG. 8 which will not be described further since it is self-explanatory.

Steps 24 and 26 may be omitted to effect the combination computation in step 110 only with the combination pattern as shown in the above table.

While a double chute assembly is used in this embodiment, a single collection chute may be used by improving the product receiving, handling and packing power of the packing machine, for example, by utilizing a bucket conveyer. Moreover, along with the improvement in packing efficiency of the packing machine, the number of deliveries of product from the combination weighing machine can be increased to more than three times every weighing cycle by conditioning the timing of the combination computation.

The weighing hoppers indicated by A and B in FIG. 7 were selected for delivery just after their weighing cycle. It is also possible to inhibit such weighing hoppers from participating in the combination computation.

In the above-described embodiments, the selected batches of product are delivered alternately from the inner and outer collection chutes 4 and 6 to the corresponding receiving devices. It may however be desirable to deliver a pair of selected batches at the same time from both chutes to outlet ports 8 and 10 in some applications. A third embodiment is proposed for use in such applications.

Figure 9:
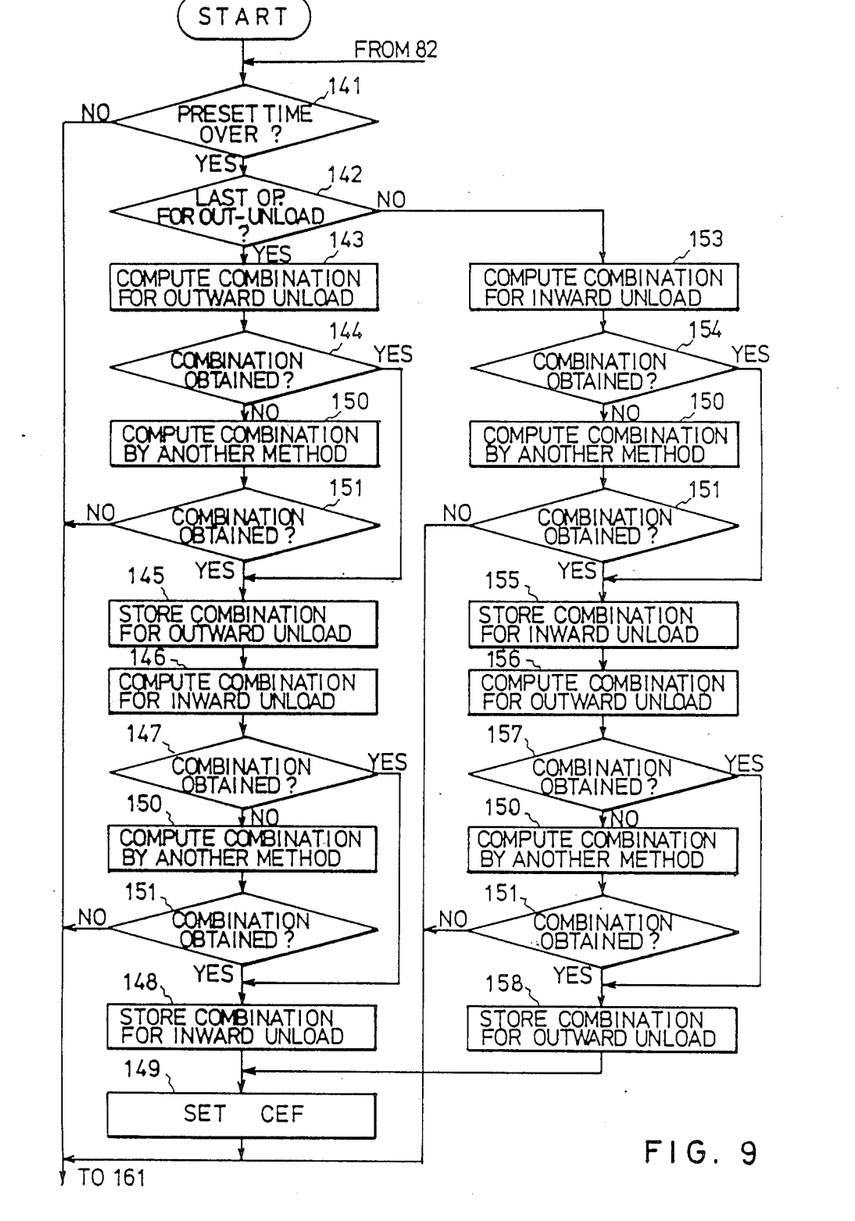
FIG. 9 is a flow chart representing an arithmetic operation sequence of a third embodiment.
Figure 10:
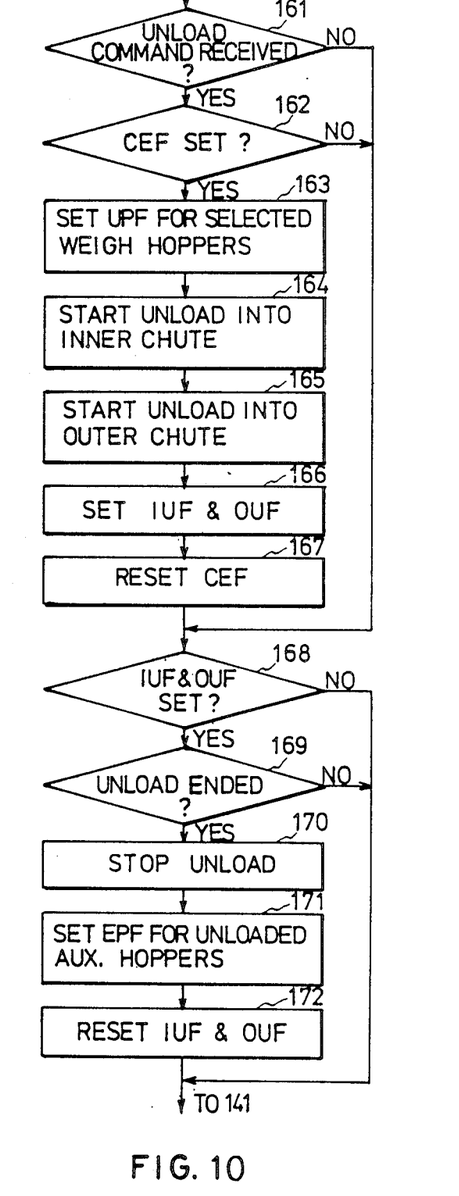
FIG. 10 is a flow chart representing an auxiliary hopper sequence of the third embodiment.

In this embodiment, the microcomputer 20 repeatedly executes the arithmetic operation sequence of FIG. 9 and the auxiliary hopper sequence of FIG. 10. When an interrupt signal is provided during the execution, it interrupts the sequence currently being executed, executes the weighing hopper sequence of FIGS. 6a and 6b and then resumes the interrupted sequence upon completion of the weighing hopper sequence. The microcomputer 20 is programmed to provide the interrupt signal, for example, at an interval of 0.01 second.

The same assumptions will be made for describing the arithmetic operation sequence of FIG. 9 as in the description of FIG. 4.

In FIG. 9, it is first inquired, in step 141, whether a predetermined time, 0.2 second for example, has passed or not after completion of the preceding delivery. For the first cycle of operation, the answer is assumed to be "YES". In the next step 142, it is inquired whether the last combination selecting operation was effected for outward unloading or not. If "YES", the first combination computation is effected in step 143 for outward unloading in the same manner as step 24 of FIG. 4. Thereafter, it is inquired in step 144 whether the desired combination has been obtained or not. If "YES", this combination is stored in the memory for outward unloading in step 145 and another first combination computation is effected in step 146 for inward unloading. Analogously, steps 147 and 148 are executed and another combination is stored in the memory for inward unloading. Then, the computation end flag (CEF) is set in step 149. If no combination was obtained in step 144 or 147, the second combination computation (similar to step 110 of FIG. 4) is effected in step 150. In the above operation, for example as shown in FIG. 12, a combination of auxiliary hoppers 12a, 12g and 12m is selected for outward unloading and another combination of auxiliary hoppers 12c, 12h and 12l is selected for inward unloading. This operation is effected within a period between $t_1$ and $t_2$, which is, for example, about 0.4 second. During this combination selection interval, about eighty (80) interrupt signals are provided and the weighing hopper sequence is executed each time an interrupt signal occurs for replenishing the emptied weighing and auxiliary hoppers and weighing the product therein.

If the answer in step 142 is "NO", the operation is progressed through steps 153-158 to step 149. In this case, however, the inward and outward unloadings are inverted.

Step 149 is followed by the auxiliary hopper sequence of FIG. 10. In FIG. 10, it is first inquired in step 161 whether an unloading command signal has been received from the packing machine or not. If "YES", it is then inquired in step 162 whether the combination end flag (CEF) has been set or not. If it has already been set in step 149, the unloading participation flags for those weighing hoppers corresponding to the selected combination, namely 14a, 14c, 14g, 14h, 14l and 14m, are set in step 163. An unloading command signal is then applied to auxiliary hoppers 12a, 12h and 12l in step 164 to start their unloading into the inner chute 4 and, at the substantially same time, the unloading command signal is also applied to auxiliary hoppers 12a, 12g and 12m in step 165 to start their unloading into the outer chute 6. Thereafter, the inner and outer unloading flags (IUF and OUF) for these unloaded auxiliary hoppers are set in step 166 and the computation end flag (CEF) is reset in step 167.

Next, it is inquired in step 168 whether the inner and outer unloading flags (IUF and OUF) have been set or not. If they have been set in step 166, it is inquired in step 169 whether the unloading operation has ended or not. This judgement may be made, for example, by inquiring whether 0.2 second has elapsed since the last unloading command signal was provided. If the answer in steps 168 or 169 is "NO", the program returns to step 141. If the answer in step 141 is "NO", step 161 follows. As the answer in step 161 is again also "NO", steps 168 and 169 are executed again.

Figure 11:
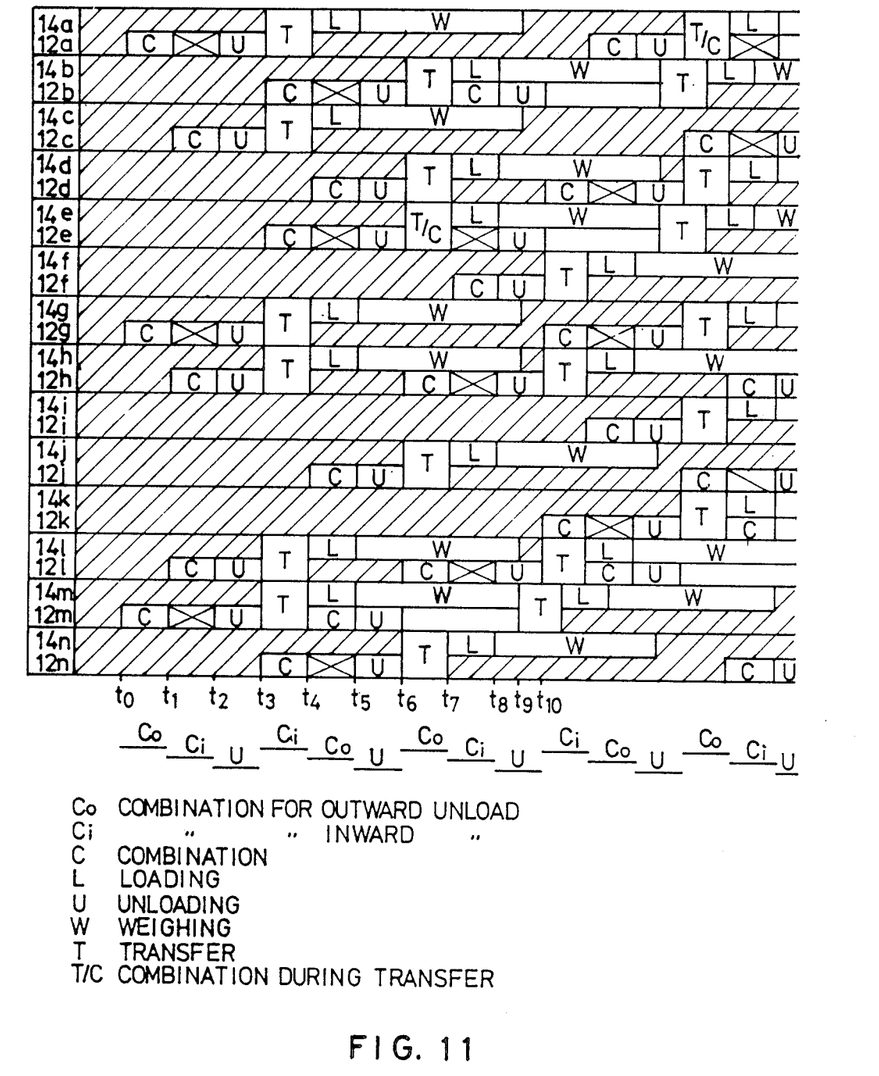
FIG. 11 is as timing chart of the third embodiment.

When the answer in step 169 becomes "YES+" during repetition of the above steps 141, 161, 168 and 169, an unloading end signal is applied to the unloaded auxiliary hoppers in step 170 to finish the unloading operation. Then, the empty flags (EMF) for the unloaded auxiliary hoppers are set in step 171 and the inner and outer unloading flags (IUF and OUF) for these auxiliary hoppers are reset in step 172. The above-described unloading step is effected, for example, within a time period of about 0.2 second between $t_2$ and $t_3$ (FIG. 11).

At time $t_3$, an interrupt signal appears to execute the weighing hopper sequence to transfer the product to the unloaded auxiliary hoppers from the corresponding weighing hoppers. At the same time, the combination computation is commenced again through steps 141 and 142. In this case, however, the answer in step 142 is "NO" and the operation is executed through steps 153 to 158 to select the combination for inward unloading first and that for outward unloading later. The reason for alternating the order of combination selection is to reduce possible differences in combination accuracy between the deliveries from the inner and outer chutes 4 and 6. In this manner, as shown in FIG. 11, the combination computation for outward unloading is started at time points $t_0$, $t_4$, $t_6$, etc. and that for inward unloading is started at time points $t_1$, $t_3$, $t_7$, etc. Such alternation of the order of combination selection need not always be adopted. In case of adopting a fixed (non-alternating) order system, it will be readily understood that either half (i.e., steps 143-148 or 153-158) of the arithmetic sequence of FIG. 9 can be omitted.

What is claimed is:

1. A combination weighing method comprising a transfer step for transferring product to empty ones of a plurality of auxiliary hoppers arranged to receive product from a plurality of weighing hoppers respectively, from those weighing hoppers corresponding to said empty auxiliary hoppers; a loading/weighing step for feeding product to said weighing hoppers having emptied by transferring the product to said empty auxiliary hoppers, and weighing the same; and a combination/unloading step effected in parallel with said transfer step and said loading/weighing step for repeatedly combining in various fashion the weights of said product having been transferred to said auxiliary hoppers and selecting from the resultant combinations a combination whose sum weight is equal or approximate to a predetermined weight, and unloading the hoppers of the selected combination to make a delivery, successive deliveries of product from said auxiliary hoppers being received concurrently by a pair of receiving device.

2. A combination weighing method as set forth in claim 1, characterized in that each delivery of product is effected in response to a command signal from a respective receiving device.

3. A combination weighing method as set forth in claim 2, characterized in that said receiving devices are packing devices.

4. A combination weighing method as set forth in claim 1, characterized in that said predetermined weight is a fixed weight throughout said combination/unloading step.

5. A combination weighing method comprising a trasnfer step for transferring product to empty ones of a plurality of auxiliary hoppers arranged to receive product from a plurality of weighing hoppers respectively, from those weighing hoppers corresponding to said empty auxiliary hoppers; a loading/weighing step for feeding product to said weighing hoppers having emptied by transferring the product to said empty auxiliary hoppers, and weighing the same; and a combination/unloading step effected in parallel with said transfer step and said loading/weighing step for repeatedly combining in various fashion the weights of product having been trasnferred to said auxiliary hoppers and the weights of product being transferred to said auxiliary hoppers and selecting from the resultant combinations a combination whose sum weight is equal or approximate to a predetermined weight, and unloading the hoppers of the selected combination to make a delivery, successive deliveries of product being received concurrently by a pair of receiving devices.

6. A combination weighing method as set forth in claim 5, characterized in that each delivery of product is effected in response to a command signal from a respective receiving device.

7. A combination weighing method as set forth in claim 6, characterized in that said receiving devices are packing devices.

8. A combination weighing method as set forth in claim 5, characterized in that said predetermined weight is a fixed weight throughout said combination/unloading step.

9. A combination weighing method comprising a transfer step for transferring product to empty ones of a plurality of auxiliary hoppers arranged to receive product from a plurality of weighing hoppers respectively, from those weighing hoppers corresponding to said empty auxiliary hoppers; a loading/weighing step for feeding product to said weighing hoppers having emptied by transferring the product to said empty auxiliary hoppers, and weighing the same; and a combination/unloading step effected in parallel with said transfer step and said loading/weighing step for repeatedly combining in various fashion the weights of product having been trasnferred to said auxiliary hoppers, the weights of product being transferred from the weighing hoppers corresponding to said empty auxiliary hoppers, and the combined weights of product contained in the auxiliary hoppers and corresponding weighing hoppers, selecting from the resultant combinations a combination whose sum weight is equal or appriximate to a predetermined weight, and unloading the hoppers of the selected combination to make a delivery, successive deliveries of product being received concurrently by a pair of receiving devices.

10. A combination weighing method as set forth in claim 9 characterized in that each delivery of product is effected in response to a command signal from a respective receiving device.

11. A combination weighing method as set forth in claim 10, characterized in that said receiving devices are packing devices.

12. A combination weighing method as set forth in claim 9, characterized in that said predetermined weight is a fixed weight throughout said combination/unloading step.

13. A method of making successive deliveries of product measured by weight with each delivery comprising a quantity of product of an acceptable weight, utilizing a plurality of weighing units, each unit comprising a weighing hopper adapted for weighing out and unloading a fraction of said quantity of product, and an auxiliary hopper adapted for receiving product unloaded from said weighing hopper and for unloading such product to contribute to a delivery, said method further utilizing memory means adapted for storing the weights of product weighed out by said weighing hoppers and unloaded into respective auxiliary hoppers, said method for each delivery comprising the steps of: unloading a plurality of weighing hoppers corresponding to respective auxiliary hoppers which were unloaded to contribute to the preceding delivery; during unloading of said plurality of weighing hoppers, initiating a combination search of (a) those weights being unloaded by said weighing hoppers and (b) those weights in the auxiliary hoppers not unloaded for the preceding delivery, to select a combination of weights to be unloaded to deliver an acceptable weight quantity; and unloading the selected combination of weights to effect a delivery of said acceptable weight quantity, successive deliveries of product being concurrently unloaded into first and second product delivery systems.

14. A method as set forth in claim 13 wherein each delivery of product is effected in response to a command signal from a respective product delivery system.

15. A method as set forth in claim 13 further comprising an alternative search step if no acceptable combination is found, said alternative search step comprising searching (a) the weights in said auxiliary hoppers and (b) the combined weights in the weighing hopper and auxiliary hopper of each weighing unit wherein both the weighing hopper and auxiliary hopper of such unit are loaded and stable.

16. A method of making successive deliveries of product measured by weight with each delivery comprising a quantity of product of an acceptable weight, utilizing a combination weighing machine of the type comprising a plurality of weighing units, each unit including a weighing hopper adapted for weighing out and unloading a fraction of said quantity and an auxiliary hopper adapted for receiving product unloaded from said weighing hopper and for unloading such product to contribute to a delivery, said method further utilizing memory means adapted for storing the weights of product weighed out by said weighing hoppers and unloaded therefrom into respective auxiliary hoppers, said combination weighing machine being operable in weighing cycles, each cycle comprising the steps of (1) initiating a weighing cycle by making a combination search to select a combination of weights corresponding to the weights of product of a plurality of weighing hoppers and/or auxiliary hoppers, (2) unloading the weighing hoppers and/or auxiliary hoppers corresponding to the selected combination of weights to effect a delivery, (3) transferring product from weighing hoppers not corresponding to the selected combination of weights to respective unloaded auxiliary hoppers, and (4) reloading the weighing hoppers from which product has been unloaded to effect said delivery or from which product has been transferred to respective auxiliary hoppers, and weighing the product in such reloaded weighing hoppers, said weighing cycle terminatihg on the completion of said reloading and weighing step, said method comprising:

initiating a first weighing cycle;

initiating before termination of the first weighing cycle a second weighing cycle excluding those weighing hoppers unloaded in the first weighing cycle and those unloaded uxiliary hoppers not having product transferred to them in the first weighing cycle;

initiating before termination of the first weighing cycle a third weighing cycle excluding those weighing hoppers unloaded in the first and second weighing cycles and those unloaded auxiliary hoppers not having product transferred to them in the first and second weighing cycles; and wherein successive deliveries effected in the unloading step of the weighing cycles are concurrently unloaded into first and second product delivery systems.

17. A method as set forth in claim 16 wherein each delivery of product is effected in response to a command signal from a respective product delivery system.

18. A method as set forth in claim 16 wherein the only weights searched in the combination searches of the first, second and third weighing cycles are weights of product in said auxiliary hoppers and weights of product unloaded by said weighing hoppers in transit to respective auxiliary hoppers.

19. A method as set forth in claim 16 wherein the only weights searched in the combination searches of the first, second and third weighing cycles are weights (a) in said auxiliary hoppers and (b) the combined weights in the weighing hopper and auxiliary hopper of each weighing unit wherein the weighing hopper and auxiliary hopper of such unit are both loaded and stable.

* * * * *